(12) United States Patent
Kosuge et al.

(10) Patent No.: US 7,018,576 B2
(45) Date of Patent: Mar. 28, 2006

(54) MANUFACTURING METHOD FOR RESIN PART OF VEHICULAR LAMP

(75) Inventors: Mamoru Kosuge, Shizuoka (JP); Makoto Sano, Shizuoka (JP); Masaru Takiguchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 368 days.

(21) Appl. No.: 10/196,378

(22) Filed: Jul. 17, 2002

(65) Prior Publication Data

US 2003/0016538 A1 Jan. 23, 2003

(30) Foreign Application Priority Data

Jul. 23, 2001 (JP) .......................... P.2001-221843

(51) Int. Cl.
*B29C 45/37* (2006.01)
*B29C 33/56* (2006.01)

(52) U.S. Cl. ................... 264/132; 264/328.1; 264/337; 264/338

(58) Field of Classification Search ................. 264/1.7, 264/2.5, 129, 132, 328.1, 328.8, 219, 337, 264/338; 249/111, 116, 134, 135; 425/808; 362/346; 427/250
See application file for complete search history.

(56) References Cited

U.S. PATENT DOCUMENTS

| 3,988,403 | A | * | 10/1976 | Angell et al. ............... 264/45.5 |
| 5,362,226 | A | * | 11/1994 | Kataoka et al. ............. 425/526 |
| 5,552,970 | A | | 9/1996 | Takezawa et al. |
| 5,653,932 | A | * | 8/1997 | Aida et al. ................... 264/219 |
| 5,806,957 | A | * | 9/1998 | Prior et al. .................. 362/459 |
| 5,842,781 | A | | 12/1998 | Yamada et al. |
| 5,866,025 | A | * | 2/1999 | Kataoka et al. .......... 249/114.1 |
| 6,398,396 | B1 | * | 6/2002 | Nestell et al. .............. 362/520 |
| 6,607,296 | B1 | * | 8/2003 | Yoshinaga et al. .......... 362/520 |
| 6,746,634 | B1 | * | 6/2004 | Shimakura ................... 264/1.9 |

FOREIGN PATENT DOCUMENTS

JP 56-84925 * 7/1981

* cited by examiner

*Primary Examiner*—Angela Ortiz
(74) *Attorney, Agent, or Firm*—Sughrue Mion, PLLC

(57) ABSTRACT

A resin part of a vehicular lamp and a method for producing such a part in which a metallic vapor deposition coating for forming a reflective surface is formed directly on a surface of a resin body part without applying an undercoating layer. The body of the resin part is produced by injecting molten resin into a cavity of a molding die in which a heat insulating layer is formed on a portion of the cavity surface corresponding to the reflective surface. A metallic vapor deposition coating is applied directly to the portions of the body of the resin part which were in contact with the heat insulating layer during injection molding.

10 Claims, 5 Drawing Sheets

MANUFACTURING METHOD FOR RESIN PART OF VEHICULAR LAMP

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

1. Field of the Invention

The present invention relates to a manufacturing method and a molding die for a resin part of a vehicular lamp. More particularly, the invention relates to such a manufacturing method and a molding die in which the time required for manufacturing and the cost of manufacturing a resin part are reduced while producing a part of improved smoothness.

2. Description of the Related Art

The resin-molded parts of a vehicular lamp generally include a reflective surface formed in at least one portion, such as a reflector of a headlamp or marker lamp, and an extension portion of a reflector. The reflective surface is generally formed by applying to the resin surface a vapor deposition coating of a metal such as aluminum.

A metallic vapor deposition coating closely follows the condition of the underlying resin surface, which serves as a substrate. Therefore, there is a problem that a smooth-appearing reflective surface, i.e., a reflective surface with a highly regular reflectance over its entire extent, cannot be obtained unless the surface of the underlying surface to which the metallic vapor deposition coating is applied has a mirror-like finish. Thus, conventionally an undercoating for the metallic vapor deposition coating is first applied to the surface of the injection-molded resin part which is to serve as a reflective surface, and the metallic vapor deposition coating is then formed on the undercoating layer.

The reasons why the undercoating layer is required will now be explained.

A cavity surface of a molding die for injection-molding a resin part, particularly a portion of the cavity surface corresponding to a surface which is to serve as a reflective surface, is finished to be mirror-like. Therefore, if the molded resin part directly follows the surface of the die, a high-quality mirror-like surface can be obtained. In general, however, there is a problem that an ideal mirror-like surface is difficult to obtain in injection molding.

The temperature of the die is approximately 40° C. to 100° C. while the temperature of molten resin is 200° C. or higher under general molding conditions. Therefore, at the instant when the injected molten resin comes into contact with the surface of the die (the cavity surface), it is cooled rapidly and a solidified layer is formed in the vicinity of the contact interface of the injected molten resin with the cavity surface. It is thought that this solidified layer reduces the transfer property for copying the cavity surface accurately.

In addition, an additive is added to the above-mentioned resin part for various reasons. When rapid cooling occurs in the vicinity of the contact interface of the molten resin with the cavity surface as described above, microscopic dents and bumps appear on the surface of the molten resin due to the difference between the shrinkage rates of the additive and the base polymer. These dents and bumps reduce the smoothness of the surface of the resin part and prevent it from being mirror-like.

Therefore, as described above, before the metallic disposition coating is applied, an undercoating layer is formed so as to increase the smoothness of the surface which is to serve as a substrate for vapor deposition.

However, since the step of forming the undercoating is interposed between the step of injection-molding the resin part and the step of forming the metallic vapor deposition coating, the number of the steps is increased. This results in an increase in cost.

BRIEF SUMMARY OF THE INVENTION

Accordingly, it is an object of the present invention to make it possible to directly form a metallic vapor deposition coating without applying an undercoating layer on a surface of an underlying resin part.

In order to solve the above-mentioned problem, a manufacturing method for a resin part of a vehicular lamp according to the present invention comprises the steps of injection-molding the body of a resin part, and directly applying a metallic vapor deposition coating to a portion of the resin body part where a reflective surface is to be formed. The above-mentioned injection molding step is performed by injecting molten resin into a cavity of a molding die in which a heat insulating layer is formed on a portion corresponding to the above-mentioned reflective surface.

Therefore, in the manufacturing method for a resin part of a vehicular lamp according to the present invention, the molten resin injected into the cavity comes into contact with the heat insulating layer in the portion corresponding to the reflective surface. Thus, instantaneous cooling is prevented and, as a result, a skin layer formed in the portion corresponding to the reflective surface is very thin. This thin skin layer can adhere to the cavity surface well due to the injection pressure, unlike a thick skin layer which is formed when high-temperature molten resin directly comes into contact with the steel material of a die and it is cooled instantaneously. As a result, the cavity surface is accurately transferred to the resin part and a mirror-like finish is obtained. Thus, it is possible to obtain a reflective surface with highly regular reflectance even when a metallic vapor deposition coating is directly formed without applying an undercoating.

In addition, in order to solve the above-mentioned problem, a molding die for a resin part of a vehicular lamp according to the present invention has a heat insulating layer formed on a portion of a surface of a cavity into which molten resin is injected, the portion corresponding to a portion which is to serve as a reflective surface of the resin part.

Accordingly, in the molding die for a resin part of a vehicular lamp according to the present invention, molten resin injected into the cavity comes into contact with the heat insulating layer in the portion corresponding to the reflective surface. Therefore, instantaneous cooling is prevented, and thus the skin layer formed in the portion corresponding to the reflective surface is very thin. This thin skin layer can adhere to the cavity surface well due to the injection pressure, unlike the thick skin layer which is formed when high-temperature molten resin directly comes into contact with the steel material of a die, and is cooled substantially instantaneously. As a result, the cavity surface is accurately transferred, and a mirror-like finish is obtained. Thus, it is possible to obtain a reflective surface with highly regular reflectance even when a metallic vapor deposition coating is directly formed without applying an undercoating.

DETAILED DESCRIPTION OF THE INVENTION

Hereinafter there will be described, with reference to the accompanying drawings, preferred embodiments of a manufacturing method and a molding die for a resin part of a vehicular lamp according to the present invention.

First, there will be briefly described a resin part of a vehicular lamp manufactured by the manufacturing method and the molding die according to the present invention.

Figure 1:
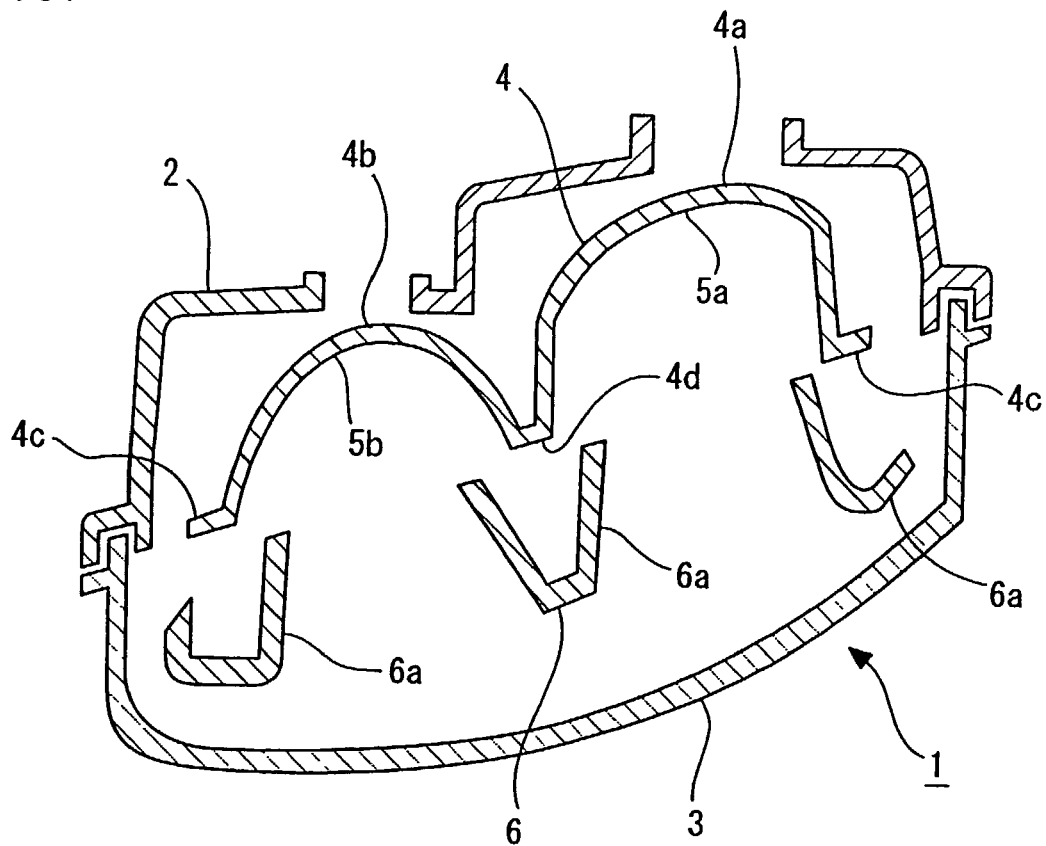
FIG. 1 is a schematic horizontal cross-sectional view of a vehicular headlamp illustrating an example of a resin part of a vehicular headlamp.

FIG. 1 is a schematic horizontal cross-sectional view of a vehicular headlamp. The front of a lamp housing 2 is covered with a cover lens 3. A reflector 4 is tiltably mounted in a lamp chamber defined by the lamp housing 2 and the cover lens 3. The reflector 4 has two reflective portions 4a, 4b. Metallic vapor deposition coatings, for example, aluminum vapor deposition coatings, are applied to inside surfaces 5a, 5b of these reflective portions 4a, 4b so that the inside surfaces 5a, 5b serve as reflective surfaces. A flange portion 4c is provided which encloses marginal portions of the reflective portions 4a, 4b. The metallic vapor deposition coating is not applied to the flange portion 4c. The metallic vapor deposition coating also is not applied to a border portion 4d between the reflective portions 4a and 4b. It is to be noted that light source bulbs (not shown) are to be mounted on the reflector 4 adjacent the reflective portions 4a, 4b.

Since the reflector 4 is tiltably mounted in the lamp chamber, space is necessary between the reflector 4 and the lamp housing 2 to accommodate the tilting movement of the reflector 4. In addition, the border portion 4d between the two reflective portions 4a, 4b does not need to be seen from the outside. On the contrary, if the border portion 4d or a gap between the reflector 4 and the housing 2 were to be viewable from the outside, the appearance of the lamp would be degraded. Therefore, in order to hide from the outside the above-mentioned border portion 4d or the gap between the reflector 4 and the lamp housing 2, an extension 6 as a decorative member, is provided. A metallic vapor deposition coating is applied to a surface 6a of the extension 6 so that the surface 6a appears to be integral with the reflective surfaces 5a, 5b of the reflector 4 and it also serves as a reflective surface.

Figure 2:
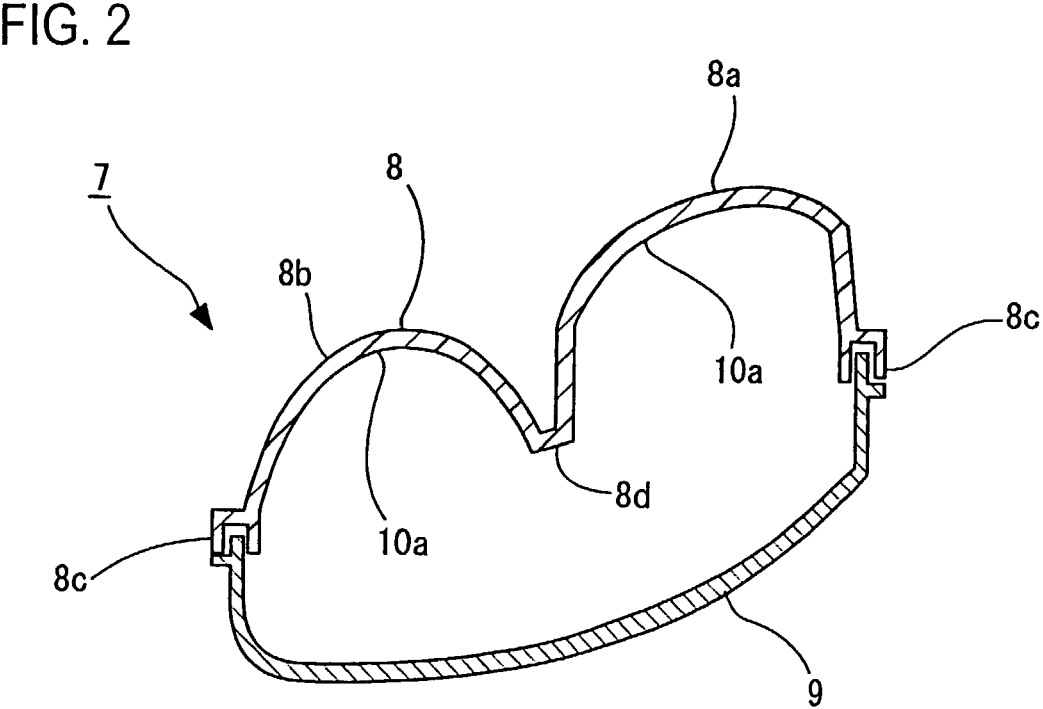
FIG. 2 is a schematic horizontal cross-sectional view of a vehicular marker lamp, illustrating an example of a resin part of a vehicular marker lamp.

FIG. 2 is a schematic horizontal cross-sectional view of a vehicular marker lamp 7. The front of a reflector 8 is covered with a cover lens 9, also thereby defining a lamp housing. The reflector 8 has two reflective portions 8a, 8b. Metallic vapor deposition coatings are applied to inside surfaces 10a, 10b of these reflective portions 8a, 8b so that the inside surfaces serve as reflective surfaces. A flange portion 8c encloses marginal portions of the reflective portions 8a, 8b. The metallic vapor deposition coating is not applied to the flange portion 8c. The metallic vapor deposition coating is not applied to a border portion 8d between the reflective portions 8a and 8b. As above, it is to be noted that light source bulbs (not shown) are mounted to the reflector 8 adjacent the reflective portions 8a, 8b.

Next, the production of the resin parts of the headlamp of FIGS. 1 and 2 will be described. First, the production of the reflector 4 will be described with reference to FIG. 3 to FIG. 6.

Figure 3:
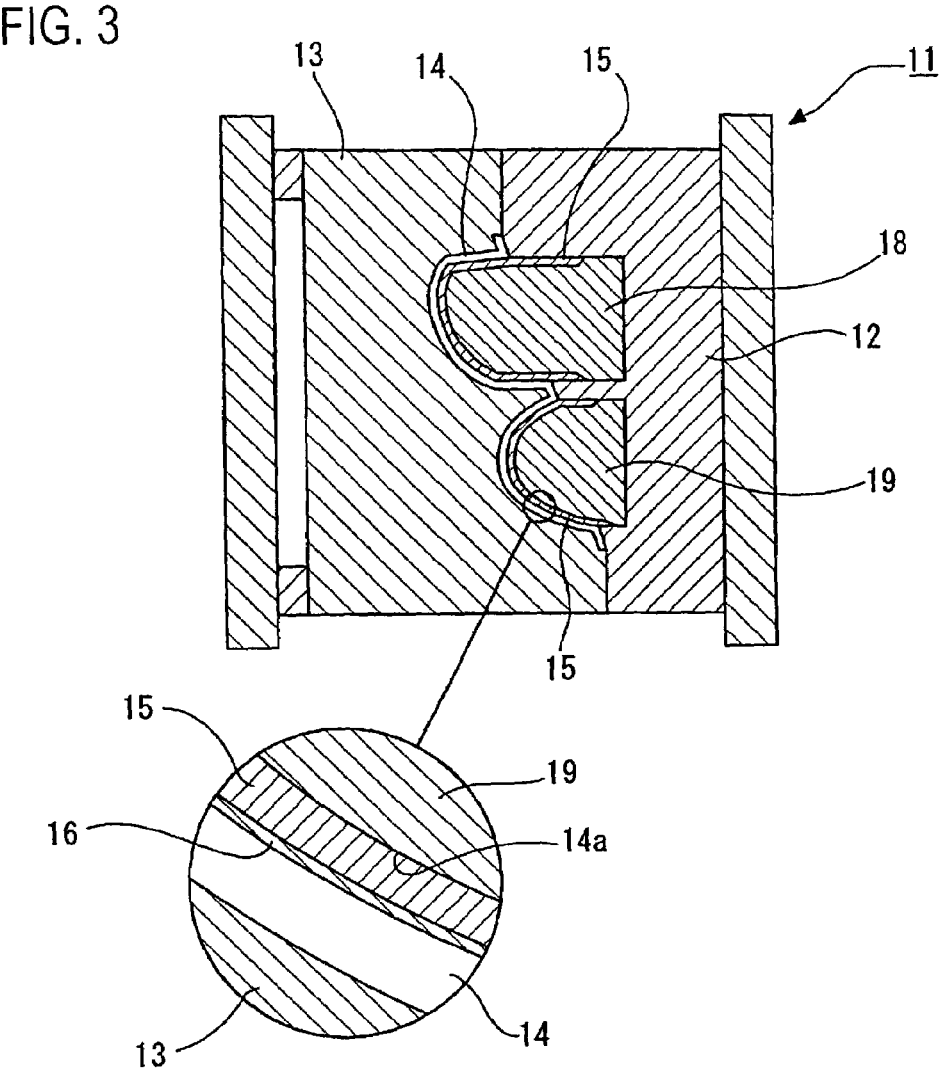
FIG. 3 is a cross-sectional view showing a molding die for molding a reflector of a vehicular headlamp.
Figure 4:
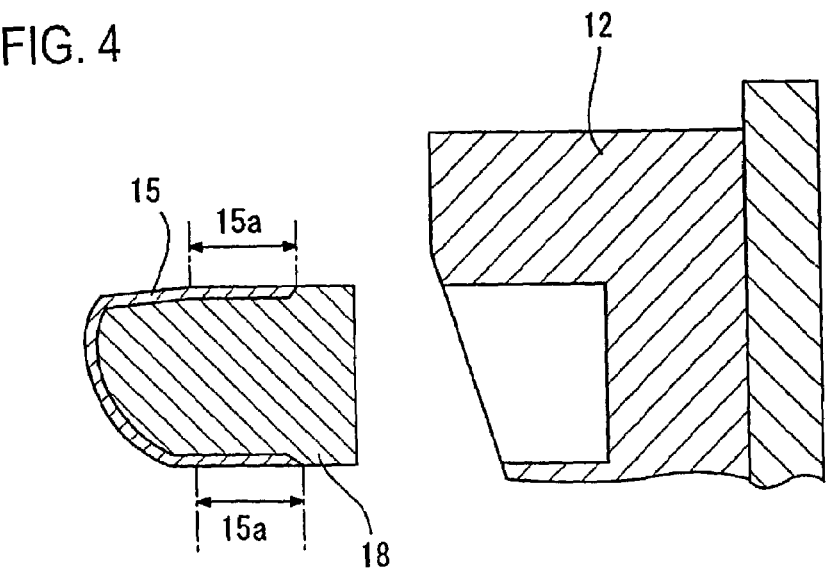
FIG. 4 is an enlarged cross-sectional view showing the die of FIG. 3 as partially broken away.

The reflector 4 of the vehicular headlamp is molded using a molding die 11 as shown in FIG. 3. The molding die 11 includes a fixed mold part 12 and a movable mold part 13. The movable mold part 13 is clamped with the fixed mold part 12, thereby forming a cavity 14, namely, a space into which molten resin is injected. In addition, in the molding die 11, a heat insulating layer 15 is formed on portions of a cavity surface 14a corresponding to portions which are to serve as reflective surfaces 5a, 5b of the reflector 4.

The heat insulating layer 15 is provided for increasing the temperature of the cavity surface so as to retard cooling in the vicinity of the contact interface of the molten resin with the cavity surface by using heat energy of the molten resin itself. The heat insulating layer 15 is made of a material having a heat conductivity lower than that of the metal material of the mold part, such as a high polymer or ceramics. The heat insulating layer 15 comes into contact with the molten resin, whose temperature is 200° C. or higher at the time of injection. The temperature of the heat insulating layer 15 is room temperature when the molding die 11 is not in use. Therefore, heat resistance and cold-heat cycle resistance are required. Further, the heat insulating layer 15 needs to have durability so that it can be used repeatedly, and adhesion strength so that it does not separate from the cavity surface 14a easily. Moreover, wear resistance is required.

As high polymer materials which satisfy these requirements, it is possible to employ, for example, polyimide resin obtained by vapor deposition-polymerizing a pyromellitic anhydride and a diamine, polyamide-imide resin obtained by vapor deposition-polymerizing a trimellitic anhydride and a diamine, polyamide resin obtained by vapor deposition-polymerizing a phthaloyl dichloride and a diamine, and polyurea resin obtained by vapor deposition-polymerizing a diamine and a diisocyanate.

For example, in order to generate a polyimide resin coating as the heat insulating layer 15, a pyromellitic anhydride and 4,4'-diaminodiphenylether are evaporated in a vapor deposition-polymerizing chamber simultaneously with raw material monomers, thereby vapor deposition-polymerizing them on the surface of the fixed mold part 2. Then, after the coating is deposited to a predetermined thickness, baking is performed in another furnace at 300° C. Thus, there is formed the heat insulating layer 15 which adheres to the surface of the fixed mold part 12, and which is a polyimide resin coating with a uniform thickness. When the heat insulating layer 15 is formed using polyimide resin, the thickness is preferably 50 μm to 100 μm.

In addition, it is preferable to deposit a peeling layer 16 made of metal or ceramics in order to protect the heat insulating layer 15 and to improve the mold releasing property of the molded part (reflector 4) (see the enlarged circled figure in FIG. 3). For example, materials suitable for forming the peeling layer 16 are metals such as chromium (Cr), chromium nitride (CrN) and tungsten (W), and ceramics such as titanium nitride (TiN) and titanium carbide (TiC), although the practice of the invention is not limited to these specific materials. It is also possible to employ general thin coating forming methods for forming a thin coating as the peeling layer 16 such as a sputtering method, an ion plating method, and a low temperature plasma CVD method.

Figure 5:
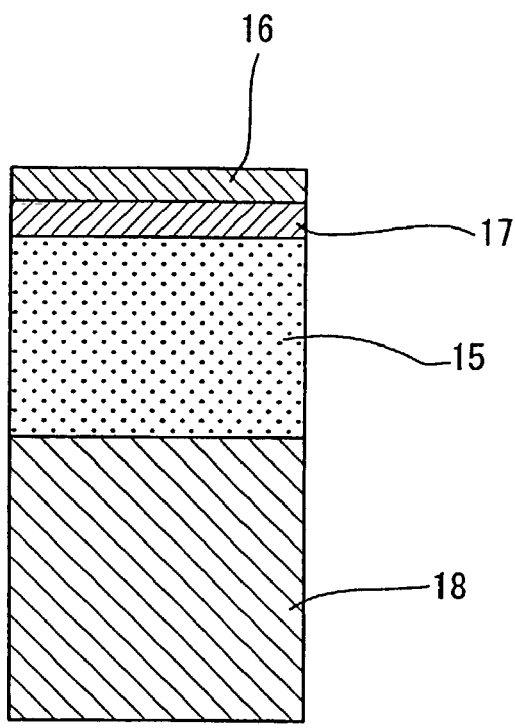
FIG. 5 is an enlarged cross-sectional view showing another example of a heat insulating portion.
Figure 6:
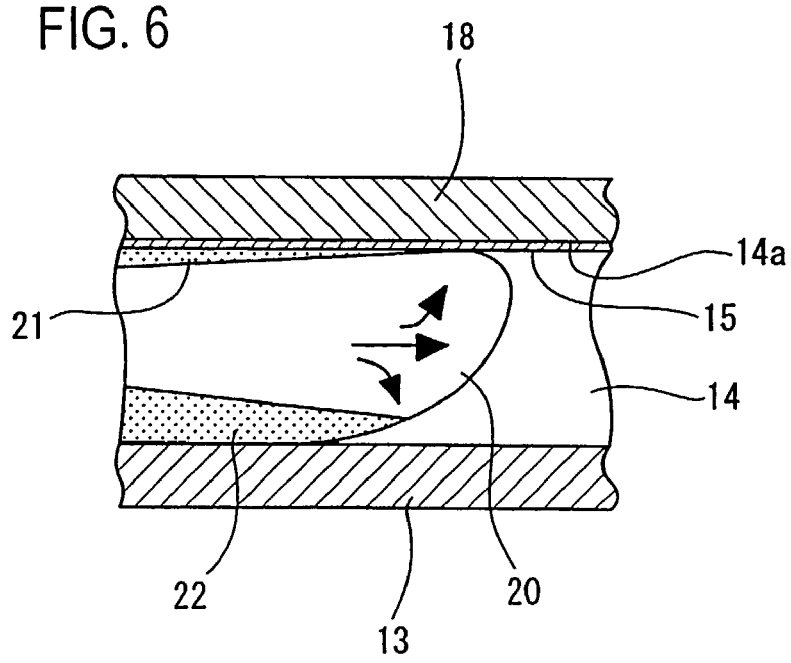
FIG. 6 is a schematic view showing the state of molten resin injected into a cavity.

When the above-mentioned peeling layer 16 is formed on the heat insulating layer 15, it is preferable to form, as the peeling layer 16, a chromium (Cr) -based or titanium (Ti) -based hard coating through an intermediate layer 17 made of chromium (Cr), etc., which adheres well to polyimide resin (refer to FIG. 5). For example, if chromium (Cr) is applied as the intermediate layer 17 to the heat insulating layer 15 made of polyimide resin coating and a layer of chromium nitride (CrN) is applied as the peeling layer 16 to the chromium (Cr) layer, the adherence between the respective layers 15, 17, 16 is good. In addition, chromium nitride (CrN) has excellent durability and wear resistance, and as a result it is possible to obtain a molding die 11 with excellent durability. Also, it is possible to deposit both the thin coating of chromium (Cr) and the thin coating of chromium nitride (CrN) by a vapor deposition method. Accordingly, the coating deposition step can be performed in the same vapor deposition chamber only by changing the atmospheric gas (in the case of chromium (Cr) argon gas is used, and in the case of chromium nitride (CrN) nitrogen gas is used). Thus, the intermediate layer 17 and the peeling layer 16 can be deposited continuously. As a result, the molding die 11 can be manufactured at low cost.

The thickness of the above-mentioned intermediate layer 17 is preferably about 0.2 μm. The thickness of the peeling layer 16 is preferably 0.2 μm to 5.0 μm.

In the above-described molding die 1 1, nested dies 18, 19, which are fitted into the fixed mold part 12, are provided to facilitate formation of the heat insulating layer. The heat insulating layer is formed in a region larger than portions of the surfaces of the nested dies 18, 19 where the heat insulating layer 15 is actually required, that is, portions corresponding to the portions which are to serve as the reflective surfaces 5a, 5b. When the nested dies 18, 19 are fitted into the fixed mold part 12, a portion 15a, which is not required, of the heat insulating layer 15 formed in the nested dies 18, 19 is hidden between the nested dies 18, 19 and the fixed mold part 12. By forming the heat insulating layer 15 in the nested dies 18, 19 in this manner, formation of the heat insulating layer 15 as described above becomes easy. In addition, the break line between the cavity surface which requires the heat insulating layer 15 and the cavity surface which does not require the heat insulating layer 15 is clarified. Also, if the heat insulating layer IS wears after use, only replacement of the nested dies 18, 19 is required, while the other components of the molding die 11 can be used as they are. Therefore, maintenance is easy and the durability of the overall molding die 11 is high.

When the reflector 8 is molded by injecting molten resin 20 into the cavity 14 of the above-described molding die 11, the transfer property becomes good in the portions which are to serve as reflective surfaces 5a, 5b, and a mirror-like surface can be obtained. In other words, in the portion where the heat insulating layer 15 is formed, heat is instantaneously stored in the heat insulating layer 15 due to the heat of the molten resin 20. The speed at which the molten resin is cooled becomes slow in the vicinity of the contact interface of the molten resin 20 with the cavity surface 14a. A skin layer 21 formed along the contact interface with the cavity surface 14a is much thinner than a skin layer 22 formed on a portion where the heat insulating layer 15 is not formed (refer to FIG. 6). Accordingly, for example, dents and bumps at particle level, which are formed due to the difference between the molding shrinkage percentage of an additive added to the molten resin and that of a base polymer, are absorbed into the molten resin due to injection pressure, and they do not appear on the surface of the reflector 4. The mirror-like surface of the cavity surface 14a is thus accurately transferred to the portions which are to serve as the reflective surfaces 5a, 5b of the reflector 4.

The reflector 4 of a vehicular headlamp is manufactured by performing aluminum vapor deposition or other metal vapor deposition directly on the portions which are to serve as the reflective surfaces of the molded part molded in the above-mentioned manner to make them reflective surfaces 5a, 5b. The reflective surfaces 5a, 5b of the reflector 4 of a vehicular headlamp, which are manufactured in this way, become reflective surfaces with highly regular reflectance.

Figure 7:
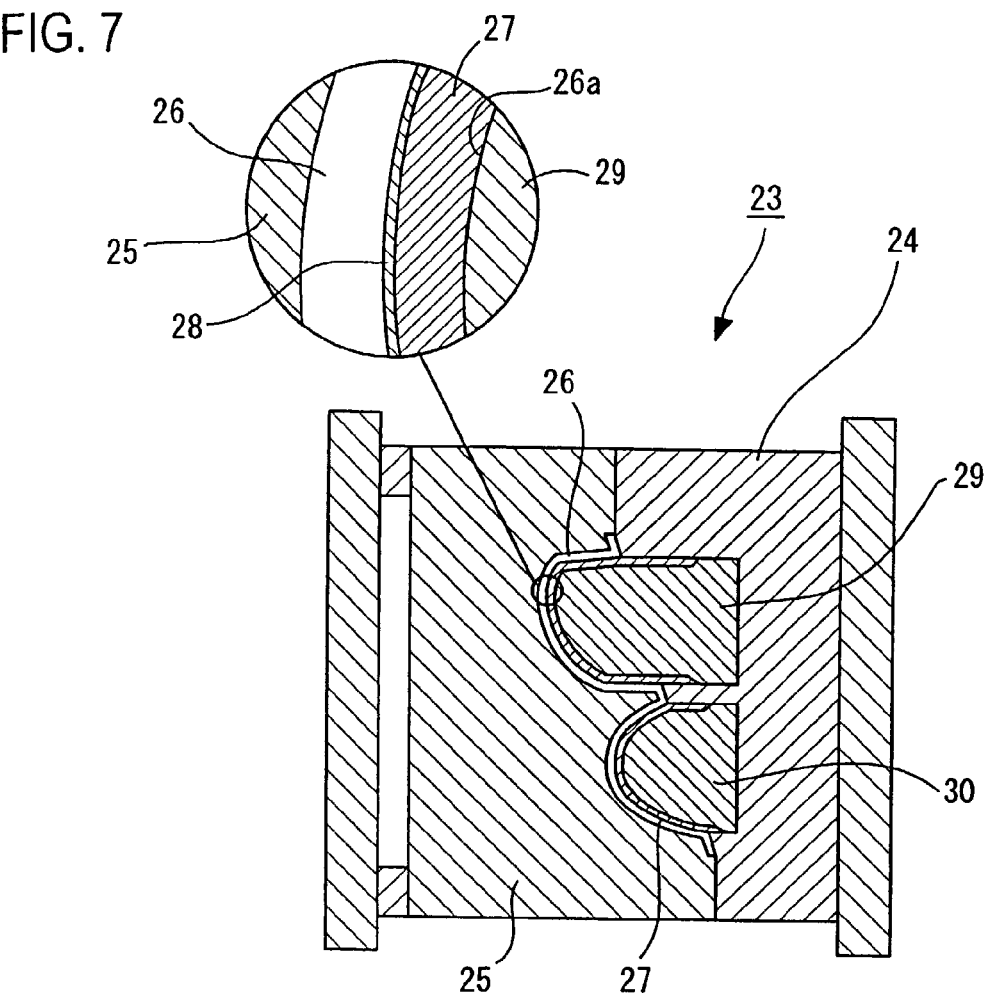
FIG. 7 is a cross-sectional view showing a molding die for molding a reflector of a vehicular marker lamp.
Figure 8:
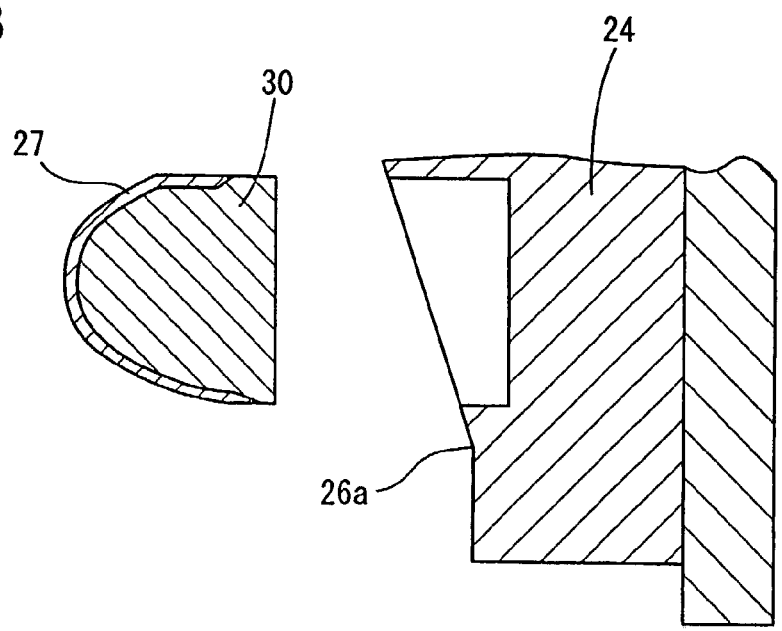
FIG. 8 is an enlarged cross-sectional view showing the molding die of FIG. 7 as partially broken away.

FIG. 7 and FIG. 8 show a molding die 23 for molding the reflector 8 of the vehicular marker lamp 7.

The molding die 23 includes a fixed mold part 24 and a movable mold part 25. The movable mold part 25 is clamped with the fixed mold part 24, thereby forming a cavity 26, namely, a space into which molten resin is injected. In the molding die 23, a heat insulating layer 27 is formed on portions of a cavity surface 26a corresponding to portions which are to serve as reflective surfaces 10a, 10b of the reflector 8. The heat insulating layer 27 is similar to the heat insulating layer 15 in the above-mentioned molding die 11. A peeling layer 28 is deposited on the heat insulating layer 27, and, if necessary, an intermediate layer is interposed between the heat insulating layer 27 and the peeling layer 28 as in the above-mentioned molding die 11.

As in the above-mentioned molding die 11, nested dies 29, 30 are employed and the heat insulating layer 27 is formed on the nested dies 29, 30, thereby facilitating formation of the heat insulating layer 27 and maintenance, and increasing the durability of the overall die 23.

When the reflector 8 of a vehicular marker lamp is molded by injecting molten resin into the cavity 26 of the above-mentioned molding die 23, surfaces of portions which are to serve as the reflective surfaces 10a, 10b are finished to be mirror-like. Thus, it is possible to obtain the reflective surfaces 10a, 10b with highly regular reflectance by applying a metallic vapor deposition coating directly to the mirror-like surfaces.

Figure 9:
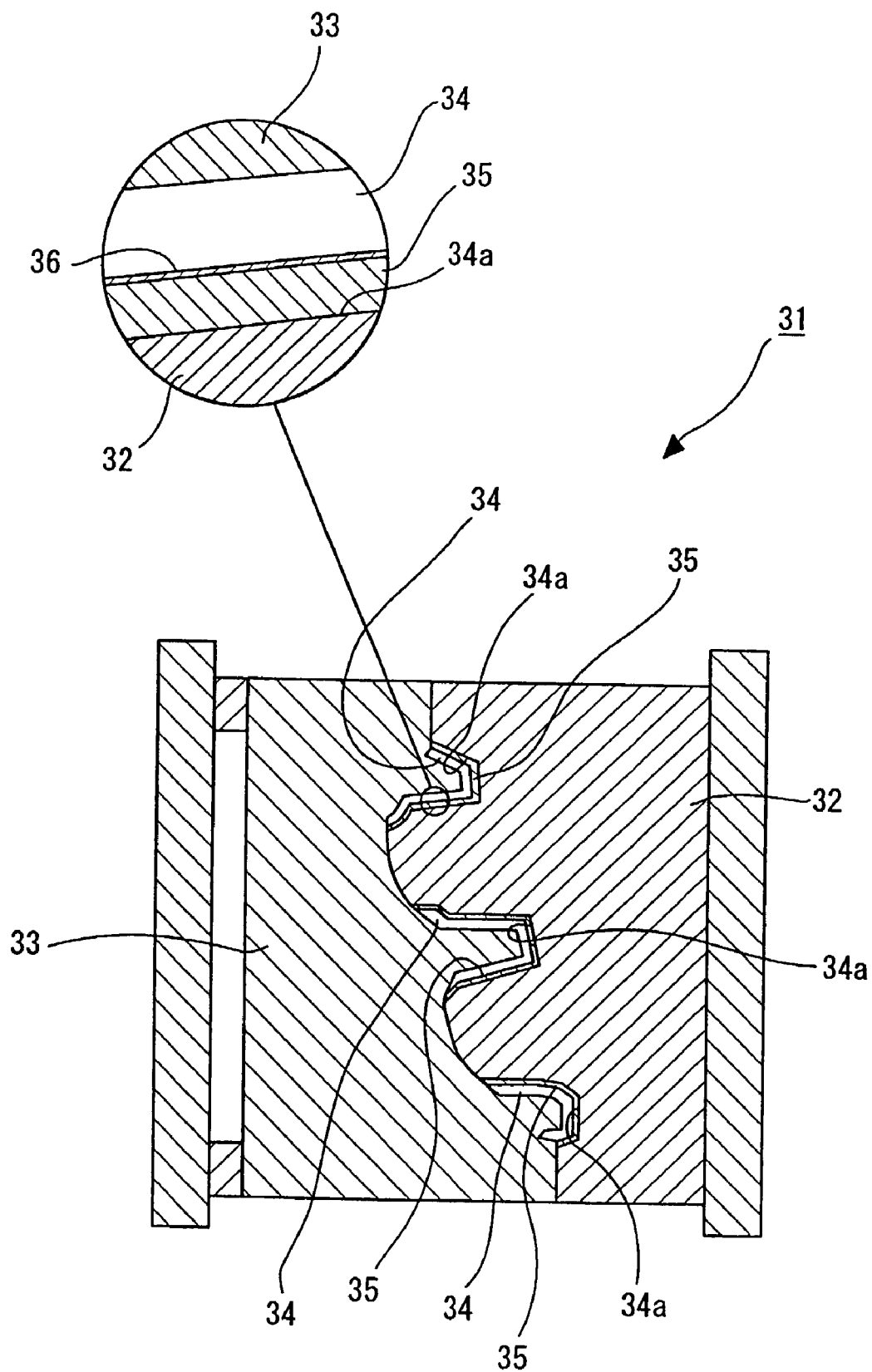
FIG. 9 is a cross-sectional view showing a molding die for molding an extension of a vehicular headlamp.

FIG. 9 shows a molding die 31 for molding an extension 6 of a vehicular headlamp.

The molding die 31 includes a fixed mold part 32 and a movable mold part 33. The movable mold part 33 is clamped with the fixed mold part 32, thereby forming a cavity 34, namely, a space into which molten resin is injected. In the molding die 31, a heat insulating layer 35 is formed on a portion of a cavity surface 34a corresponding to a surface 6a of the extension 6. The heat insulating layer 35 is similar to the heat insulating layer 15 in the above-mentioned molding die 11. A peeling layer 36 is deposited on the heat insulating layer 35, and, if necessary, an intermediate layer is interposed between the heat insulating layer 35 and the peeling layer 36 as in the above-mentioned molding die 11.

When the extension 6 of a vehicular headlamp is molded by injecting molten resin into the cavity 34 of the above-mentioned molding die 31, the surface 6a is finished to be mirror-like. Thus, it is possible to obtain a reflective surface with highly regular reflectance by applying a metallic vapor deposition coating directly to the mirror-like surface 6a.

As described above, when a resin part of a vehicular lamp is molded using the manufacturing method and the molding die according to the present invention, it is possible to mold a mirror-like surface which is to serve as a substrate for a reflective surface and to form a reflective surface with highly regular reflectance without applying an undercoating as conventionally required, that is, by applying a metallic vapor deposition coating directly to a surface which is to be a substrate for the reflective surface.

It is to be noted that the shape or structure of each portion shown in each of the above-mentioned embodiments is only an example of embodying the present invention, and the technical scope of the present invention should not be construed in a limited manner because of these embodiments.

As is apparent from the above description, the invention provides a manufacturing method for a resin part of a vehicular lamp which includes a reflective surface at least in one portion. The manufacturing method includes the steps of injection-molding the above-mentioned resin part and applying a metallic vapor deposition coating directly on the reflective surface of the above-mentioned resin part. The manufacturing method is characterized in that the above-mentioned injection molding step is performed by injecting molten resin into a cavity of a molding die in which a heat insulating layer is formed on a portion of a cavity surface, the portion corresponding to the above-mentioned reflective surface.

Accordingly, in the manufacturing method for a resin part of a vehicular lamp according to the present invention, the molten resin injected into the cavity comes into contact with the heat insulating layer in the portion corresponding to the reflective surface. Thus, instantaneous cooling is prevented, and as a result a skin layer formed in the portion corresponding to the reflective surface is very thin. This thin skin layer can adhere well to the cavity surface due to the injection pressure, unlike a thick skin layer which is formed when high-temperature molten resin directly comes into contact with the steel material of the die, and it is cooled instantaneously. Therefore, the cavity surface is accurately transferred and a mirror-like finish is obtained. Thus, it is possible to obtain a reflective surface with highly regular reflectance even when the metallic vapor deposition coating is directly formed without applying an undercoating.

A peeling layer may be formed on the heat insulating layer, thereby improving the mold releasing property of the resin par-t and increasing the durability of the heat insulating layer.

The cavity surface on which the above-mentioned heat insulating layer is formed is may be formed on a nested die which is fitted into a mold part. Therefore, formation of the heat insulating layer is easy and maintenance is simplified, and furthermore, the durability of the molding die is increased.

Since the molten resin contains an additive, the physical properties of the resin part can be improved by appropriately choosing the type of the additive.

The molding die for a resin part of a vehicular lamp according to the present invention has a reflective surface. A metallic vapor deposition coating is applied directly to the reflective surface. The molding die is characterized in that a heat insulating layer is formed on a portion of a cavity surface of a cavity into which molten resin is injected, the portion corresponding to the above-mentioned reflective surface.

Accordingly, in the molding die for a resin part of a vehicular lamp according to the present invention, since the molten resin injected into the cavity comes into contact with the heat insulating layer in the portion corresponding to the reflective surface, instantaneous cooling is prevented, and thus, a skin layer formed on the portion corresponding to the reflective surface is very thin. This thin skin layer can adhere to the cavity surface well due to injection pressure, unlike a thick skin layer which is formed when high-temperature molten resin directly comes into contact with the steel material of the die, and it is cooled instantaneously. As a result, the cavity surface is accurately transferred, and a mirror-like finish is obtained. Thus, it is possible to obtain a reflective surface with highly regular reflectance even when the metallic vapor deposition coating is directly formed without applying an undercoating.

A peeling layer may be formed on the heat insulating layer, thereby improving the mold releasing property of the resin part and increasing the durability of the heat insulating layer.

The cavity surface, on which the above-mentioned heat insulating layer is formed, is formed as part of a nested die to be fitted into a mold part. Therefore, formation of the heat insulating layer is easy and maintenance is simplified, and furthermore the durability of the molding die is increased.

Since the above-mentioned molten resin contains an additive, the physical properties of the resin part can be improved by appropriately choosing the type of the additive.

It should further be apparent to those skilled in the art that various changes in form and detail of the invention as shown and described above may be made. It is intended that such changes be included within the spirit and scope of the claims appended hereto.

What is claimed is:

1. A manufacturing method for a resin part of a vehicular lamp, said resin part having a reflective surface on at least one portion thereof, said method comprising:

providing a molding die having a cavity for molding a body of said resin part, said molding die comprising a heat insulating layer formed on portions of a surface of said cavity corresponding to said reflective surface of said resin part;

injecting molten resin into said cavity of said molding die;

removing the molded body of said resin part from said molding die; and applying a metallic vapor deposition coating directly to a surface of said molded body of said resin part molded in contact with said heat insulating layer to form the reflective surface.

wherein said cavity surface on which said heat insulating layer is formed comprises a portion of a nested die to be fitted into a mold part; and further comprising forming a peeling layer on said heat insulating layer.

2. The manufacturing method for a resin part of a vehicular lamp according to claim 1, wherein said peeling layer is made of a material selected from the group consisting of metal and ceramics.

3. The manufacturing method for a resin part of a vehicular lamp according to claim 1, wherein said peeling layer is made of a material selected from the group consisting of chromium (Cr), chromium nitride (OrN), tungsten (W), titanium nitride (TiN), and titanium carbide (TiC).

4. The manufacturing method for a resin part of a vehicular lamp according to claim 1, wherein said heat insulating layer is made of polyimide resin, and wherein said peeling layer comprises a chromium (Cr)-based hard coating and an intermediate layer of chromium adhering said chromium (Cr)-based hard coating to said polyimide resin.

5. The manufacturing method for a resin part of a vehicular lamp according to claim 1, wherein said molten resin contains an additive.

6. The manufacturing method for a resin part of a vehicular lamp according to claim 1, wherein said heat insulating layer is made of a material selected from the group consisting of high polymers and ceramics.

7. The manufacturing method for a resin part of a vehicular lamp according to claim 1, wherein said heat insulating layer is made of a material selected from the group consisting of polyimide resin obtained by vapor deposition-polymerizing a pyromellitic anhydride and a diamine, polyamide-imide resin obtained by vapor deposition-polymerizing a trimellitic anhydride and a diamine, polyamide resin obtained by vapor deposition-polymerizing a phthaloyl dichloride and a diamine, and polyurea resin obtained by vapor deposition-polymerizing a diamine and a diisocyanate.

8. The manufacturing method for a resin part of a vehicular lamp according to claim 1, wherein said heat insulating layer is made of polyimide resin of a thickness in a range of 50 μm to 100 μm.

9. The manufacturing method for a resin part of a vehicular lamp according to claim 1, wherein said heat insulating layer is made of polyimide resin produced by the steps of: evaporating a pyromellitic anhydride and 4,4'-diaminodiphenylether in a vapor deposition-polymerizing chamber simultaneously with raw material monomers to vapor deposition-polymerizing them on said molding die to a predetermined thickness; and baking said molding die in another furnace at a temperature of approximately 300° C.

10. The manufacturing method for a resin part of a vehicular lamp according to claim 9, wherein said predetermined thickness is in a range of 50 μm to 100 μm.

* * * * *